Aug. 25, 1964 R. A. HIRCHERT 3,145,512
FIXTURE FOR HOLDING AND POSITIONING TOOL
Original Filed March 1, 1960 2 Sheets-Sheet 1

INVENTOR
RICHARD A. HIRCHERT
by Byron, Huma, Broen and Clement
ATTORNEYS

Aug. 25, 1964          R. A. HIRCHERT          3,145,512
            FIXTURE FOR HOLDING AND POSITIONING TOOL
Original Filed March 1, 1960                2 Sheets-Sheet 2
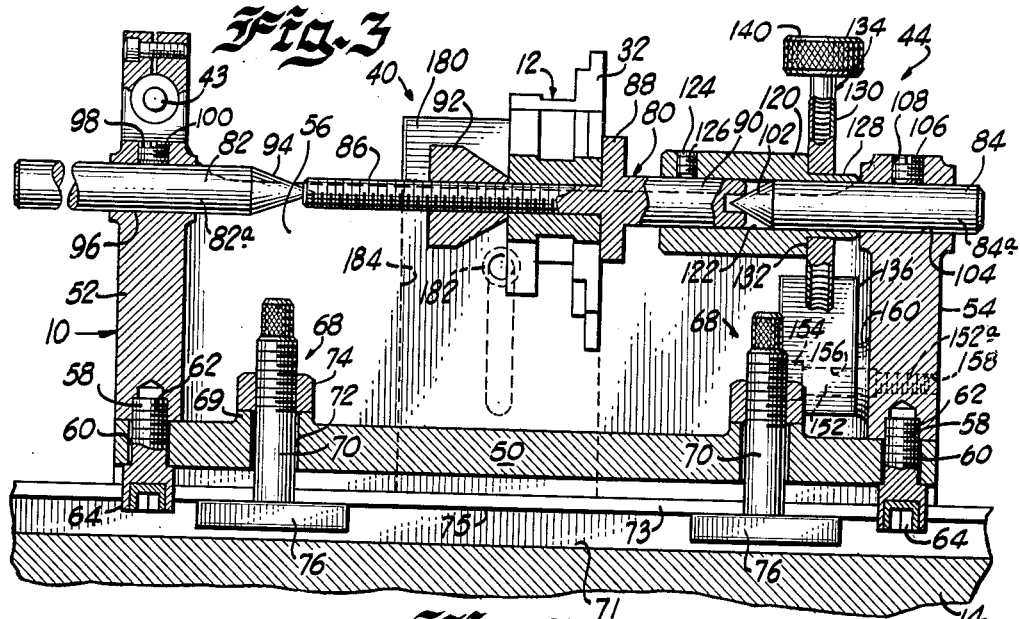
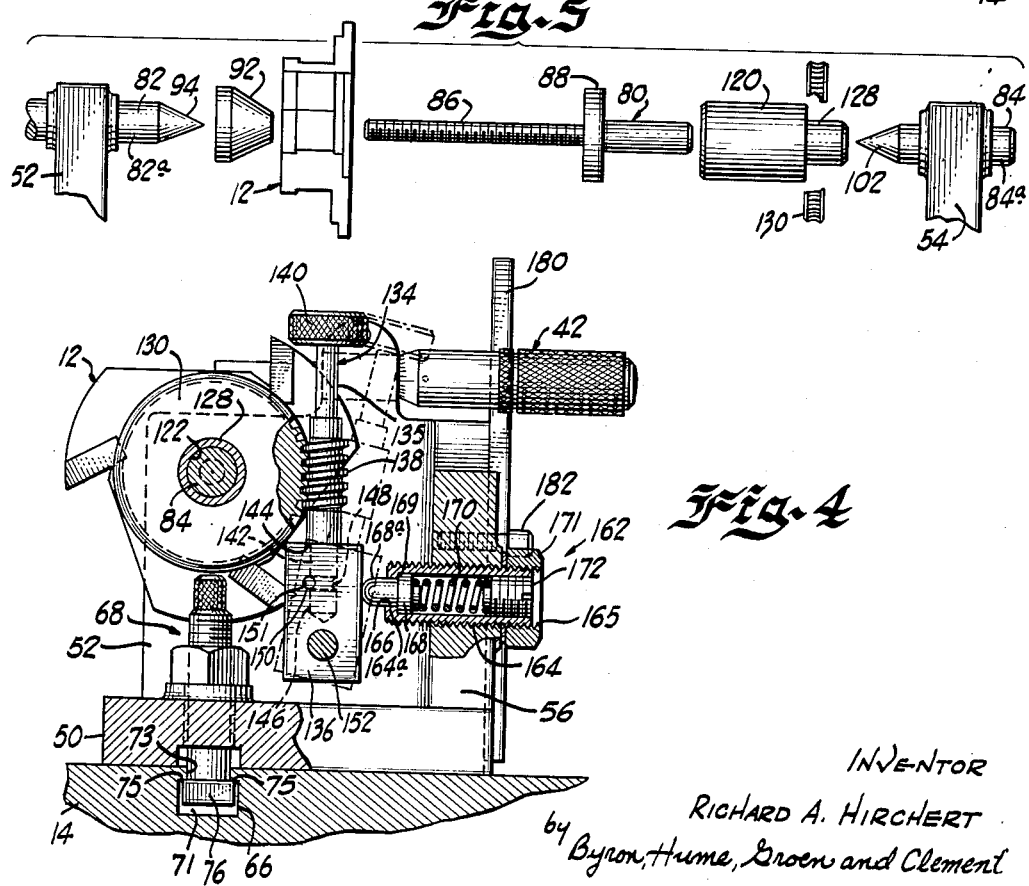
INVENTOR
RICHARD A. HIRCHERT
by Byron, Hume, Groen and Clement
ATTORNEYS 3,145,512
FIXTURE FOR HOLDING AND
POSITIONING TOOL
Richard A. Hirchert, Hinsdale, Ill., assignor to Crafts
Tool and Gage Corp., a corporation of Massachusetts
Continuation of application Ser. No. 12,010, Mar. 1,
1960. This application Jan. 15, 1963, Ser. No. 253,519
4 Claims. (Cl. 51—225)

The present invention relates to tool fixtures and, more particularly, to fixtures for circular form tools.

The present application is a continuation of the applicant's prior co-pending application entitled "Tool Fixture," Serial No. 12,010, filed March 1, 1960, now abandoned.

It is an object of the present invention to provide a new and improved fixture for a circular form tool.

It is another object of the present invention to provide a fixture that permits circular form tools to be readily sharpened and inspected.

It is a further object of the present invention to provide for a circular form tool a fixture that permits a selected one of the cutting faces of the tool to be quickly moved into a desired angular position preparatory to its sharpening.

It is yet a further object in accordance with the previous object to effect a vernier adjustment of the tool to facilitate sharpening of the selected cutting face.

It is still a further object of the present invention to provide for a circular form tool a fixture which includes provision for an adjustment mechanism that effects the desired rotation of the tool and also restrains the tool from rotation.

It is another object of the present invention to provide for a circular form tool a fixture that is usable with any conventional surface grinder, cutter grinder, or similar machine.

It is still another object of the present invention to provide for a circular form tool a new and improved fixture which maintains the tool along a predetermined center line, yet permits the tool to be removed and replaced in the fixture without complicated realigning procedures.

It is a further object of the present invention to provide for a circular form tool a new and improved fixture that is adapted to be used with a grinding machine for the purpose of sharpening the cutting faces of the tool, yet in no way relies upon the relatively inaccurate cross feed mechanism of the machine to effect an accurate sharpening of the cutting faces.

It is another object of the present invention to provide for circular form tools a fixture that has provision for accommodating certain commonly available shop measuring equipment to effect the measurement of the offset of a circular form tool that is not to be sharpened.

The above and other objects are realized in accordance with the present invention by providing a new and improved fixture adapted particularly to hold circular form tools during sharpening and inspection. The fixture is adapted to be secured to the movable table of a suitable grinding machine, for example, a surface grinder or cutter grinder. The circular form tool is fixedly held by a suitable centering arrangement which is so constructed that the tool can be removed from and replaced in the centering arrangement without a time-consuming realignment procedure. A manually actuable adjusting mechanism is operative to permit the circular form tool to be turned by substantial amounts to move a selected one of its cutting faces in a predetermined position preparatory to grinding. In addition, the mechanism is operative to permit the tool to be turned by small amounts to effect the desired sharpening or grinding of the selected cutting faces. In order to maintain constant the offset in each circular form tool during a sharpening operation, a suitable measuring device is embodied in the fixture to locate the grinding wheel or the like in a predetermined position relative to the tool. By the above-described arrangement, any circular form tool can be readily inserted, removed from, and replaced in the fixture without time-consuming realignment operations and, further, can be quickly and easily sharpened and/or inspected in the fixture.

The invention, both as to its organization and method of operation, taken with further objects and advantages thereof, will best be understood by reference to the following description taken in connection with the accompanying drawings, in which:

FIG. 3 is a sectional view taken along line 3—3 of FIG. 2;

FIG. 4 is a sectional view taken along line 4—4 of FIG. 2;

FIG. 6 is a fragmentary end elevational view of a portion of the fixture of FIG. 1.

Figure 1:
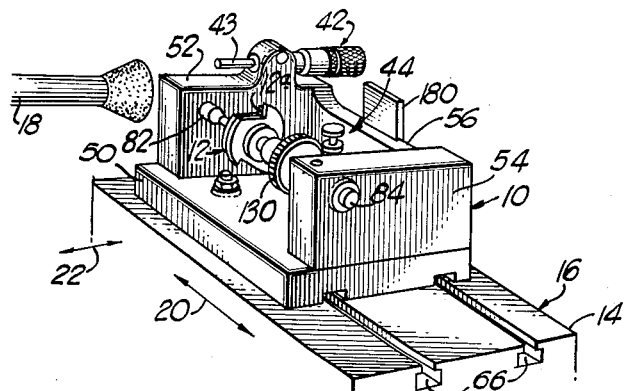
FIG. 1 is a perspective view of a fixture embodying the principles of the present invention.

Referring now to the drawings and in particular to FIG. 1, a fixture embodying the features of the present invention is illustrated and is generally identified by reference numeral 10. The fixture 10 is primarily useful in fixedly holding a circular form tool 12 during a sharpening or refacing operation. In this connection, the fixture 10 is mounted on a movable table 14 of a grinding machine 16, for example, a surface grinder or a cutter grinder, embodying a suitable grinding wheel 18, shown fragmentarily in FIG. 1 only. The table 14 of the grinding machine 16 is of the reciprocal type and moves longitudinally, as indicated by the double-arrowed line 20, by suitable motor means (not shown), while the table 14 is moved laterally in a direction indicated by the double-arrowed line 22 by a suitable cross-feed mechanism (not shown) to move the fixture 10 and the grinding wheel 18 relative to one another.

Before considering the structural and the functional details of the fixture 10, it should be emphasized that the primary purpose of the fixture 10 is to hold the circular form tool during a sharpening or grinding operation and during inspection. The fixture 10, however, is not used during the forming or manufacture of the circular form tool and, further, is not used when the circular form tool is employed to cut stock or the like material.

Referring now to the construction of the circular form tool 12, per se, attention is specifically directed to FIGS. 1, 2, 3 and 6. The tool 12 comprises a generally flattened cylindrical body 24 having a central bore 26 and a plurality of spaced-apart cutaway portions 28. In part of each cutaway portion 28 there is adhesively secured a slug 30 of relatively hard material, for example, cemented tungsten carbide. The slug 30 has an outer surface that conforms to the periphery of the tool 12 and has a cutting face 32 including a cutting edge 34 on the periphery of the body 24 (see FIG. 3). The cutting edge 34 has a shape dependent upon the type of cutting that the circular form tool 12 is required to perform and is formed during manufacture of the tool 12 by apparatus not described or shown.

As is well known, all circular tools are offset a certain amount in relation to the center line of the work piece. This offset is provided to gain the peripheral clearance needed to obtain satisfactory cutting action by the tool. If the tool is positioned in such a manner that its center line is located above the center line of the work piece, only a minute portion of the tool just below the cutting edge engages the work piece. Hence, in most tools, the offset guarantees a peripheral or front clearance of a minimum of approximately 5 degrees. In the circular form tool 12, the offset, identified by the double-headed dotted line 36, is imparted to the tool 12 during its manufacture. With this specific offset, the tool 12 is adapted to perform certain cutting functions and, accordingly, it is necessary that the offset 36 be maintained constant, irrespective of wearing of the cutting surfaces 32. Of course, with tool usage the cutting surfaces 32 wear and the offset 36 of the tool is likely to change. As a result, it is the general practice in the trade to sharpen or grind the cutting surfaces 32. In this connection, the fixture 10 is used to hold the tool 12 during a sharpening or grinding operation which does not, in any way, alter the actual offset of the tool 12.

Referring now generally to the fixture 10, it briefly comprises a holding and centering arrangement 40 which, as the name implies, fixedly positions the circular form tool 12 relative to the fixture 10 and the table 14. The circular form tool 12 is quickly and readily held by the arrangement 40 and, more importantly, can be removed from and replaced in the arrangement 40 without any complicated realignment procedure. A suitable measuring means 42 is employed to set the grinding wheel 18 in a position relative to the circular form tool 12 corresponding to the specific offset of the tool 12. In order to turn the tool 12 into predetermined rotary positions, a tool-adjusting mechanism 44 is employed. The mechanism 44 permits the tool 12 to be moved by large amounts so that a selected cutting surface 32 can be moved into a grinding position and, in addition, effects the movement of the tool 12 by small amounts to effect the removal of a predetermined amount of material from its cutting face 32 during a grinding or sharpening operation. Furthermore, the mechanism 44 coacts with the holding and centering mechanism 40 to maintain the tool 12 in a rigid, non-rotative position. Finally, a measuring plate is used to measure the offset of a tool that is not being sharpened and, furthermore, to determine if the grinding wheel is worn and, accordingly if the grinding operation will impart a new offset to the tool 12.

The constructional details of the fixture 10 will now be described. The fixture comprises a base plate 50 of generally rectangular shape made from metallic material, for example, steel. The base plate 50 supports a pair of spaced wall plates 52 and 54 that are interconnected adjacent their rear ends by a back plate 56, the plates 52, 54, and 56 being fixedly secured to the base plate 50 by suitable fasteners. For example, as shown in FIG. 3, threaded fasteners 58 extend upwardly through oversized apertures 60 in the base plate 50 into threaded apertures 62 defined in the wall plates 52 and 54, the fasteners 58 having enlarged heads 64 extending downwardly into keyways 66 that are oriented longitudinally of the table 14, as shown in FIG. 1. Although not clear from the drawings, two fasteners 58 interconnect the wall plates 52 and 54 with the base plate 50 while two fasteners (not shown) interconnect the rear plate 56 and the base plate 50.

Considering particularly FIGS. 1, 3, and 4, the fixture 10 may be secured to the table 14 in any one of a plurality of longitudinal positions by a pair of attaching devices 68 supported from the base plate 50. Each attaching device 68 comprises a bolt 70 that extends upwardly through an oversized opening 72 in the base plate 50 into threaded engagement with a nut 74. At the lower end of the bolt 70 there is provided a key or head 76 which lies in the keyway or T-slot 66 which includes, as best shown in FIG. 4, a key-receiving portion 71 and a slot portion 73 interconnected by a pair of generally horizontal shoulders 75. With the nuts 74 engaging the extreme upper end of the bolts 70 and resting on bosses 69 of the base plate 50, the keys 76 are consecutively inserted into the key-receiving portion 71 of the front keyway 66 and the fixture 10 is manually moved to its desired position on the table 14. Incident to rotation of the nuts 74, the bolts 70 move upwardly through the nuts, with the result that the keys 76 frictionally engage the shoulders 75 and fixedly secure the fixture to the table 14. By the above-described arrangement, the fixture 10 can be located at any relative position on the table 14 prior to a sharpening of the cutting surface 32 of the tool 12.

If it is desired to sharpen or grind the cutting surfaces 32 of the tool 12, the tool 12 must be mounted to the fixture 10. In this connection, the tool 12 is fixedly secured to the holding and centering arrangement 40 comprising an arbor 80 suitably positioned between and coacting with a pair of center elements 82 and 84 that are supported from the wall plates 52 and 54, respectively. More particularly, the tool 12 is first secured to the arbor 80 and then the assembled tool 12 and arbor 80 are mounted on the centering elements 82 and 84. Actually, the tool 12 is slipped over a tool-receiving shank 86 of the arbor 80 and is moved into engagement with a stop 88 defined between the shank 86 and the right end 90 of the arbor 80. The right side of the tool 12, seen in FIG. 3, is driven into frictional engagement with the left side of the stop 88 by a knurled nut 92 which threadedly engages the shank 86 of the arbor 80. By this arrangement, the tool 12 is fixedly locked to the arbor 80 and is unable to move longitudinally or to rotate relative to the arbor 80. With the tool 12 and the arbor 80 in assembled condition, the unit is ready to be mounted to the centering elements 82 and 84.

As shown best in FIG. 3, the centering element 82 comprises a cylindrical rod made of suitable metallic material and having a generally conical right end 94, as seen in FIG. 3, for coacting with the bored end of the arbor shank 86. The body 82a of the centering element 82 extends through an oversized opening 96 defined through the upper end of the wall plate 52. A suitable setscrew 98 is located in a threaded aperture 100 with the opening 96 for fixedly securing the centering element 82 to the wall plate 52. By this arrangement, the conical end 94 is fixedly positioned intermediate the wall plates 52 and 54 and provides a fixed support point for the left end of the shank 86 of the arbor 80. Similarly, the centering element 84 comprises a cylindrical rod of metallic material and includes a generally conical left end 102, as seen in FIG. 3, for coacting with the bored right end 90. The body 84a of the centering element 84 extends through an oversized opening 104 defined in the upper end of the wall plate 54. A setscrew 106 is located in an aperture 108 connecting with the opening 104 for fixedly securing the centering element 84 to the plate 54. By this arrangement, the conical end 102 is fixedly located intermediate the wall plates 52 and 54 and provides a rigid supporting point for the right end of the arbor 80.

It will be appreciated that, prior to mounting of the tool and arbor unit to the fixture 10, the centering element 84 is rigidly secured to the wall plate 54 while the centering element 82 is loosely supported by the wall plate 52. Actually, the element 84 is inserted through the oversized opening 104 and is moved into its desired position. Thereafter, the setscrew 106 is tightened to lock the element 84 in its desired position relative to the end plate 54. Next, the centering element 82 is inserted through the oversized opening 96, but is withdrawn to the left so that the conical end 94 is adjacent to the wall plate 52. In contrast to the centering element 84, the setscrew 98 is not tightened so that the centering element 82 is free to move in the oversized opening 96.

The tool and arbor unit is mounted to the centering elements 82 and 84 simply by moving the right end 90 of the arbor into engagement with the conical end 102 of the centering element 84. The shank 86 of the arbor 80 is moved into axial alignment with the elements 82 and 84 and then the centering element 82 is manually moved to the right so that its conical end 94 engages the shank 86 of the arbor 80. While the centering element 82 is urged to the right to maintain the elements 82 and 84 and the arbor 80 in assembled relation, the setscrew 98 is turned into frictional engagement with the centering element 82.

Figure 2:
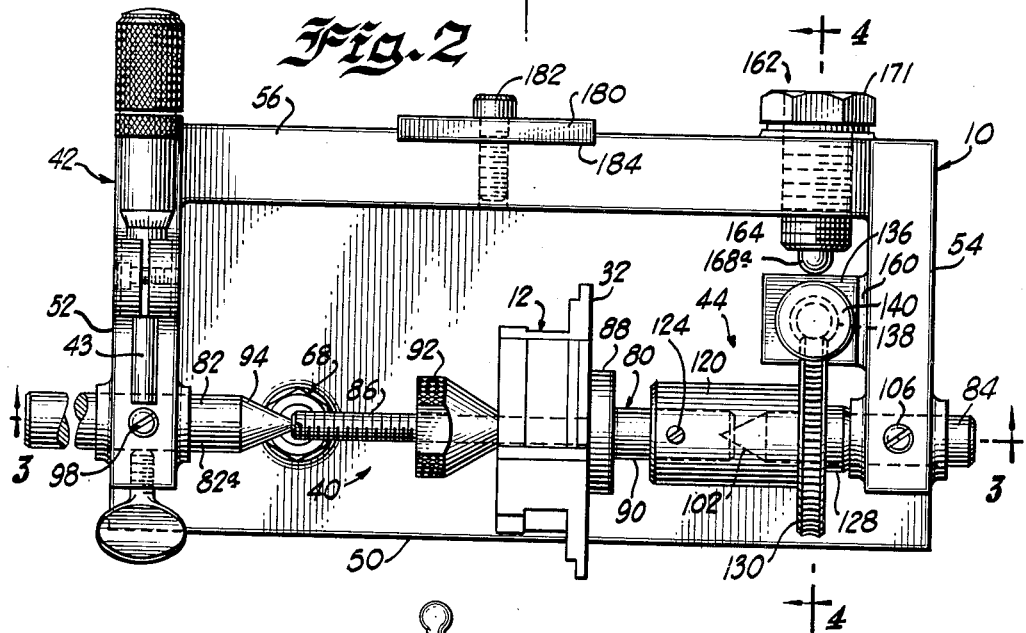
FIG. 2 is a top plan view of the fixture of FIG. 1.

In accordance with a feature of the present invention, the angular position of the circular form tool 12 is adjustable by the tool adjustment mechanism 44, seen best in FIGS. 2, 3, and 4. Although not previously described, a bushing 120 is loosely positioned about the left end of the centering element 84 prior to mounting of the arbor 80 to the element 84. Hence in mounting, the right end 90 of the arbor 80 passes into the bore 122 of the bushing 120 and, assuming that a setscrew 124 located in aperture 126 at the left end of the bushing 120 does not extend into the bore 122, the arbor 80 contacts the conical end 102 of the centering element 84. In this relation, the arbor 80 and tool 12 are free to turn and are substantially unrestrained in rotation. The exploded elevational view of FIG. 5 clearly illustrates the relative positions of the above-described components. In any event, in accordance with another preliminary step, the setscrew 124 is turned into frictional engagement with the right end 90 of the arbor 80, with the result that the arbor 80 is locked to the bushing 120 which, as described hereinbelow, is restrained from rotation so that the tool and arbor unit is also restrained from rotation.

Figure 5:
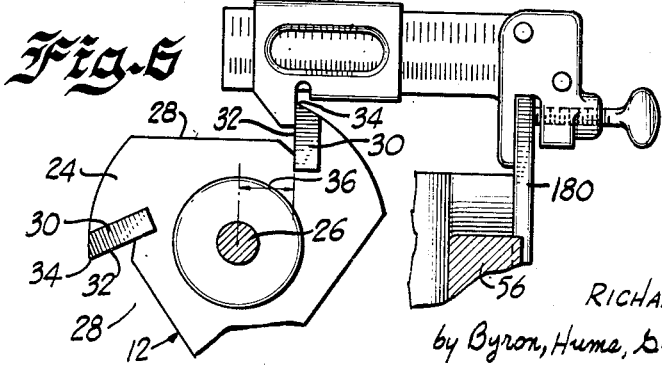
FIG. 5 is an exploded elevational view of a portion of the fixture of FIG. 1.

The bushing 120, as shown best in FIGS. 4 and 5, has a cylindrical body portion of substantial thickness provided at its right end with a somewhat reduced neck portion 128. The bushing 120 is integrally connected to a worm wheel 130 and to this end, the wheel 130 is press-fitted over the neck portion 128 into frictional engagement with a shoulder 132 defined between the body portion and the neck portion 128 of the bushing 120. As a precautionary measure, a suitable adhesive or the like is applied to the neck portion 128 and shoulder 132 to assure that the worm wheel 130 and the bushing 120 are locked together.

In accordance with an aspect of the present invention, the worm wheel 130 is in driving engagement with a manual actuator generally identified as 134 and shown best in FIG. 4. The manual actuator 134 is movable between an operative position, illustrated in solid lines in FIG. 4, wherein a driving connection is established with the worm wheel 130, and an inoperative position illustrated in dotted lines in FIG. 4, wherein no driving conection is established with the worm wheel 130. As shown, the actuator embodies a worm gear 138 so that when the worm gear 138 is in driving engagement with the worm wheel 130, the tool 12 is fixedly positioned relative to the fixture 10 and cannot be rotated. This result obtains since the tool 12 is locked to the arbor 80 by the knurled nut 92, the bushing 120 is locked to the arbor 80, the worm wheel 130 is threadedly locked to the worm gear 138—as long as the worm gear 138 does not rotate. Hence, the tool-adjusting mechanism 44, in addition to effecting the movement of the tool 12 as described below, functions in cooperation with the above-described components to rigidly position the tool 12 on the fixture 10.

It will be appreciated that when the actuator is in its operative position with its worm gear 138 drivingly connected to the worm wheel 130, the tool 12 can be rotated continuously, as contrasted with incrementally, by very slight amounts under the direct control of the worm gear 138. As is well known, the worm gear 138 must rotate an appreciable amount before the worm wheel 130, and hence the tool 12 rotates any significant amount. Accordingly, a fine adjustment of the tool 12 and, in particular, a fine positioning of the cutting surfaces 32 of the tool 12 is provided to facilitate the grinding or sharpening operation. However, when the worm gear 138 is moved into its inoperative position, the driving connection between the worm gear 138 and the worm wheel 130 is broken, whereby the tool 12 is neither restrained against rotation nor fixedly secured to the fixture 10. Accordingly, the tool 12 can be easily turned by an operator grasping the tool 12, itself, the arbor 80, the bushing 120 or the worm wheel 130 to effect the desired rotary movement of the tool 12. For example, if it is desired to move a selected one of the cutting faces 32 into a grinding position, any one of the above-described elements can be manually turned—without interference from the adjustment mechanism 44 and, in a broad sense, the mechanism 44 permits coarse adjustment of the tool 12. From the foregoing discussion, it will be appreciated that the mechanism permits coarse adjustment of the tool 12 for the purpose of moving a selected cutting face 32 into a grinding position and, also, provides fine adjustment of the tool 12 for the purpose of removing predetermined amounts of material from the cutting face 32 during a grinding operation.

Considering now the constructional details of the actuator 134 and referring specifically to FIG. 4, it comprises a rod element 135 rotatably mounted to a block 136 which is pivotally secured to the wall plate 54. The shaft element 135 includes intermediate its ends the worm gear 138 which, as described above, is adapted to drive the worm wheel 130 when the gear 138 is in its operative position shown in solid lines in FIG. 4. A rotatable connection is effected between the rod element 135 and the block 136 by providing at the lower end of the element 135 a neck portion 142 of smaller diameter than the body of the element 135, an annular shoulder 144 being defined between the body of the element 135 and the neck portion 142. The shoulder 144 seats on the upper surface of block 136 while the neck portion 142 is disposed within a bore 146 defined longitudinally of the pivotal block 136, the bore 146 including an annular keyway 148 for accommodating a pin 150 inserted through an opening 151 in the block 136 into coacting engagement with the keyway 148. Hence, although the element 135 is unable to be withdrawn from the block 136 because of the pin 150, the pin 150 permits the element 135 to rotate relative to the block 136.

The pivotal movement of the block 136 and hence the movement of the actuator 134 is made possible by a pivot pin 152 supported from the wall plate 54. As shown in dotted lines in FIG. 3, a pivot pin 152 having an enlarged head 154 is disposed within a bore 156 defined through the block 136, the threaded end 152a of the pivot pin 152 being received within a threaded aperture 158 defined in the wall plate 54. A suitable washer 160 or the like is disposed between the block 136 and the inner surface of the wall plate 54. By this arrangement, the actuator 134 is able to pivot about the pivot pin 152 in the plane of the worm wheel 130.

In order to bias the actuator 134 into engagement with the worm gear 130, a plunger arrangement 162 is supported from the back plate 56 to coact with the block 136. Specifically, the arrangement 162 includes a sleeve 165 located within a threaded bore 164 in the back plate 56 and having an enclosed end 164a in which is defined an aperture 166. The tip 168a of a plunger 168 extends through the aperture 166 and is biased into engagement with the side of the block 136 by a coil spring 170, the plunger 168 having an annular shoulder 169 engageable with the enclosed end 164a to prevent the plunger 168 from moving out of assembly with the sleeve 165. The coil spring 170 is located between the right end of the plunger 168 and a slug 172 disposed within the internally threaded sleeve 165. An adjusting nut 171 is threaded onto the right end of the sleeve 165 into abutting engagement with the rear plate 56, thereby locking the sleeve 165, and hence the plunger 168, in a predetermined position relative to the block 136. By the plunger arrangement 162, the worm gear 138 is continuously biased into engagement with the worm wheel 130 by the coil spring 170 acting through the plunger 168, the block 136, and the element 135. The worm gear 138 and the worm wheel 130 can be disengaged by manually grasping the knurled knob 140 and pivoting the knob 140 to the right, as seen in FIG. 4. The movement of the knurled knob 140 to the right effects the compression of the spring 169, with the result that a biasing force is developed to return the worm wheel 138 into engagement with the worm wheel 130 upon release of the knurled knob 140.

Let it be assumed that the tool 12 is fixedly secured to the arbor 80 and the arbor 80 is mounted between the centering elements 82 and 84, then the adjustment mechanism 44 fixedly positions the tool 12 and its cutting faces 32 in a predetermined position relative to the fixture 10. Since no attempt is made to position any one of the cutting faces 32 of the tool 12 in a grinding position during mounting of the tool and arbor unit, the cutting faces 32 assume a random angular position. Hence, in order to move a selected cutting face 32 into a substantially vertical position, as shown in FIGS. 3 and 4, the knurled knob 140 is grasped and the actuator 134 is rotated to the right, as seen in FIG. 4, so that disengagement of the worm gear 138 and the worm wheel 130 is effective. Thereafter, the tool 12, itself, worm wheel 130, the arbor 80, or the bushing 120 is grasped and the selected cutting face 32 moved into a substantially vertical position, as shown in FIGS. 3 and 4. With the tool 12 in its desired position, the knurled knob 140 is released whereby worm gear 138 is moved into engagement with the worm wheel 130 under the control of the spring 170 and plunger 168.

Prior to actually sharpening the selected cutting surface 32, the grinding wheel 18 must be properly positioned relative to the circular form tool 12 in accordance with the offset of the tool 12. In this connection, the measuring means 42, comprising a conventional micrometer is set so that its adjustable end 43 is spaced from the center line of the centering elements 82 and 84 by an amount exactly equal to the offset of the circular form tool 12. With the grinding wheel in an inoperative condition, the table 14 is actuated to move the micrometer and grinding wheel 18 into axial alignment. Thereafter, the cross feed (not shown) of the machine 16 is operated to move the end 43 of the micrometer 42 into abutting engagement with the grinding wheel 18. The cross feed is then rendered inoperative and as long as it remains inoperative, the offset remains constant, assuming of course that the grinding wheel does not wear down an appreciable amount.

With the above-described preliminary steps completed, the grinding wheel 18 is started and the table 14 is moved longitudinally, as indicated by the double-arrowed solid line 20, to bring the grinding wheel 18 adjacent to the circular form tool 12. Next, the table 14 is operated so that it reciprocates in the direction indicated by the double arrowed solid line 20, and the cutting tool and the entire fixture 10 move past the grinding wheel 18. Inasmuch as the selected cutting surface 32 is in a substantially vertical position, the first pass of the tool 12 by the grinding wheel 18 may or may not remove a slight amount of material from the slug 30. Assuming that only an insignificant amount is removed and the entire cutting surface 32 is therefore not sharpened, the following procedure is followed: The knurled knob 140 is grasped and, instead of pivoting the actuator 134 to the right, the knob 140 is turned in a clockwise direction as viewed in FIG. 2 by a relatively slight amount, with the result that the cutting face 32 moves to the left, as viewed in FIG. 4, toward the grinding wheel 18. Accordingly, on the next pass of the tool 12, the grinding wheel removes an additional amount of stock. The knurled knob 140 is subsequently turned as described above so that successive amounts of stock are removed until the entire cutting surface 32 is sharpened. It should be appreciated that, irrespective of the amount of material removed from the slug 30, the offset of the circular tool 12 remains the same because of the pre-alignment of the grinding wheel 18 with the center line of the tool 12 and, further, that the grinding operation is performed entirely independently of the cross feed of the machine 16.

If at any time during the grinding operation it is desired to more closely inspect the cutting surface 32 or, alternatively, it is desired to subject the cutting surface 32 to a test or the like, the tool 12 can be readily removed from the fixture 10 by simply unscrewing the setscrew 98 and, thereby, releasing the arbor 80 from the center elements 82 and 84. The knurled nut 92 can be loosened, with the result that the tool 12 is freed from the arbor 80 and can be inspected or tested, as desired. Thus, for example, if it is determined that additional sharpening or grinding is required, the tool 12 can be readily assembled to the arbor 80 and the tool and arbor unit mounted quickly and easily to the centering elements 82 and 84. No realignment procedure is required because the generally conical ends 94 and 102 of the centering elements cause the arbor 80, and hence the tool 12, to be automatically aligned along the center lines of the elements 82 and 84. Accordingly, the grinding operation can be continued with only a minimum set down and set up time lapse.

In accordance with another feature of the present invention, a measuring plate 180 is detachably secured to the back surface of the rear plate 56 by a suitable bolt 182, as best seen in FIGS. 1, 2, and 6. The rectangular measuring plate 180 seats in a recess 184 and serves two specific functions. First, the plate 180 is used as a reference point for any readily available measuring instrument, for example, a micrometer or vernier caliper, to measure or check the offset of a circular form tool that is not being sharpened, (see FIG. 6). Second, the plate 180 provides a fixed reference for the measuring instrument when used to determine whether or not the grinding wheel 18 has been worn and, accordingly, an offset different than that desired is being set into the circular form tool during a sharpening or grinding operation. In this connection, the measuring instrument can also be used to determine whether or not the micrometer 42 is inaccurate and is improperly locating the grinding wheel 18 relative to the tool 12, thereby effecting a change in the offset of the tool as a result of the grinding operation. The inaccuracy of the micrometer 42 can result from damage caused by the grinding wheel 18 or other shop tools contacting the micrometer 42.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A fixture for holding a tool in a grinding machine, said fixture comprising frame means, adjustable centering means supported from said frame means and adapted to be drivingly connected to an arbor means by which said tool is supported, and means including a worm gear-worm wheel arrangement for fixedly positioning said tool relative to said machine, said arrangement including a worm wheel adapted to be fixedly connected to said arbor means and a worm gear assembly pivotally supported from said frame means, said worm gear assembly being movable between a first position in driving engagement with said worm wheel for effecting fine adjustment of said tool so that it can be sharpened by a grinding wheel of the machine independently of the machine's cross feed mechanism, and a second position out of driving engagement with said worm wheel for permitting coarse adjustment of said tool preparatory to a grinding operation, and resilient stop means supported from said frame means opposite said worm gear assembly from said worm wheel, said stop means normally urging said worm gear assembly into said first position in intimate engagement with said worm wheel.

2. The fixture of claim 1 further characterized in that said resilient stop means includes housing means mounted on said frame for adjustment transversely of the axis of rotation of said worm wheel, a plunger slidable in said housing means into engagement with said worm gear assembly, and resilient means in said sleeve urging said plunger into engagement with said assembly.

3. The fixture of claim 2 further characterized in that said worm gear assembly includes block means pivotally mounted on said frame means, and a worm gear rotatably mounted in said block means, said plunger engaging said block means to urge said worm gear into intimate engagement with said worm wheel.

4. The fixture of claim 3 further characterized by and including micrometer means supported from said frame means in transverse relationship to said axis, said micrometer means including a transversely positionable pin having limit stop means thereon for engagement by the grinding wheel of the grinding machine to establish a predetermined position for the wheel preparatory to sharpening the tool.

References Cited in the file of this patent
UNITED STATES PATENTS

| | | |
|---|---|---|
| 166,705 | Krutzsch | Aug. 17, 1875 |
| 2,746,218 | Bowie et al. | May 22, 1956 |
| 2,748,624 | Costello | June 5, 1956 |
| 3,000,469 | Froehlich | Sept. 19, 1961 |

FOREIGN PATENTS

| | | |
|---|---|---|
| 1,061,358 | France | Nov. 25, 1953 |

UNITED STATES PATENT OFFICE
CERTIFICATE OF CORRECTION

Patent No. 3,145,512

August 25, 1964

Richard A. Hirchert

It is hereby certified that error appears in the above numbered patent requiring correction and that the said Letters Patent should read as corrected below.

Column 5, line 49, for "conection" read -- connection --; column 6, line 57, for "gear" read -- wheel --; column 7, line 1, for "contnuously" read -- continuously --.

Signed and sealed this 8th day of December 1964.

(SEAL)
Attest:

ERNEST W. SWIDER
Attesting Officer

EDWARD J. BRENNER
Commissioner of Patents